N. R. PATTEN.
DOUGHNUT MACHINE.
APPLICATION FILED NOV. 5, 1920.

1,389,976.

Patented Sept. 6, 1921.
8 SHEETS—SHEET 6.

INVENTOR:
N. R. PATTEN.
By Whiteley
and Ruckman
ATTORNEYS

N. R. PATTEN.
DOUGHNUT MACHINE.
APPLICATION FILED NOV. 5, 1920.

1,389,976.

Patented Sept. 6, 1921.
8 SHEETS—SHEET 7.

UNITED STATES PATENT OFFICE.

NATHANIEL R. PATTEN, OF MINNEAPOLIS, MINNESOTA.

DOUGHNUT-MACHINE.

1,389,976.	Specification of Letters Patent.	Patented Sept. 6, 1921.

Application filed November 5, 1920. Serial No. 421,883.

*To all whom it may concern:*

Be it known that I, NATHANIEL R. PATTEN, a citizen of the United States, residing at Minneapolis, in the county of Hennepin and State of Minnesota, have invented certain new and useful Improvements in Doughnut-Machines, of which the following is a specification.

My invention relates to doughnut machines. An object is to provide a machine in which the operations of shaping and cooking doughnuts are performed expeditiously and automatically from the time when the dough is delivered to the machine up to the time when the cooked doughnuts are delivered from the machine. Another object is to provide a machine in which the doughnuts will not only be produced in large quantities but in which all of the operations, such as conditioning and turning, will be performed automatically at the proper time so that the cooked doughnuts will be delivered in best possible condition.

The full objects and advantages of my invention will appear in connection with the detailed description thereof, and the novel features embodied in my inventive idea will be particularly pointed out in the claims.

In the accompanying drawings which illustrate the application of my invention in one form,—

Figure 1:
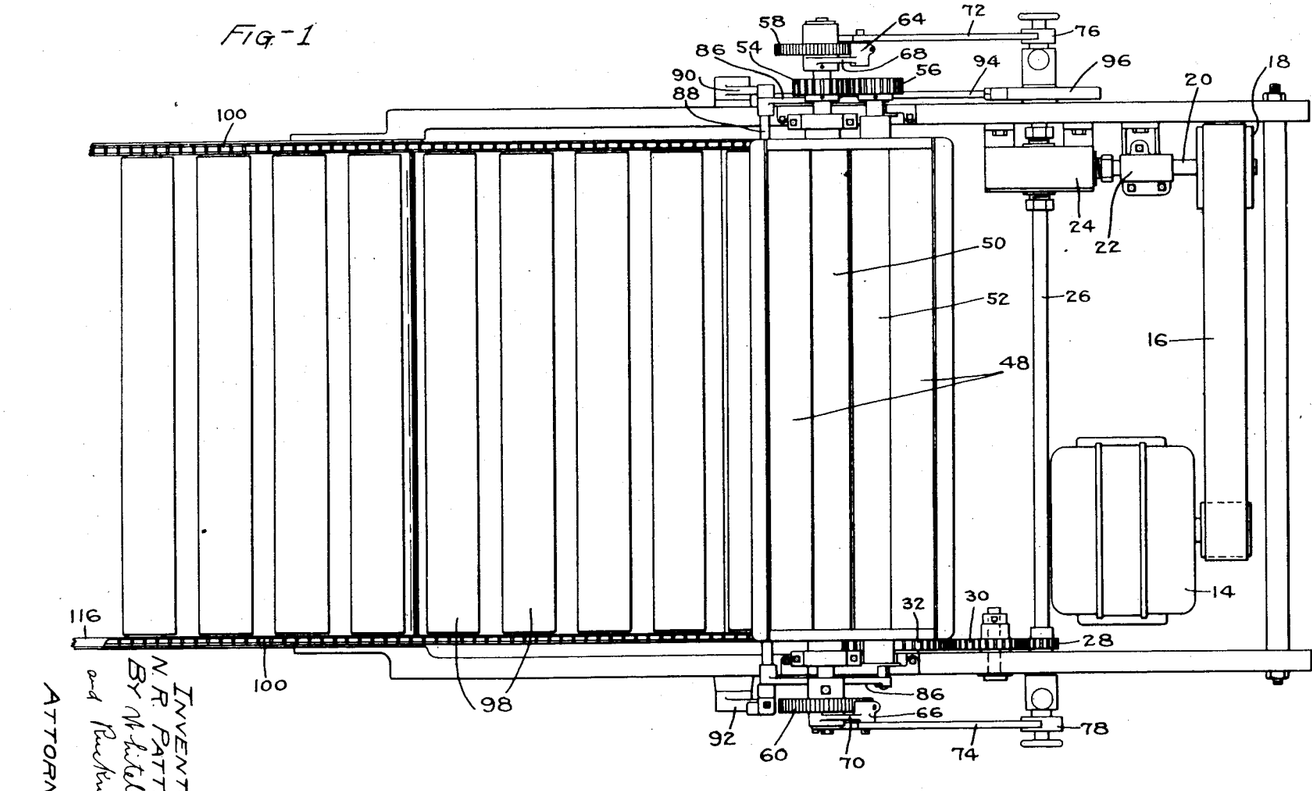
Figure 1 is a top plan view of the front portion of the machine.
Figure 2:
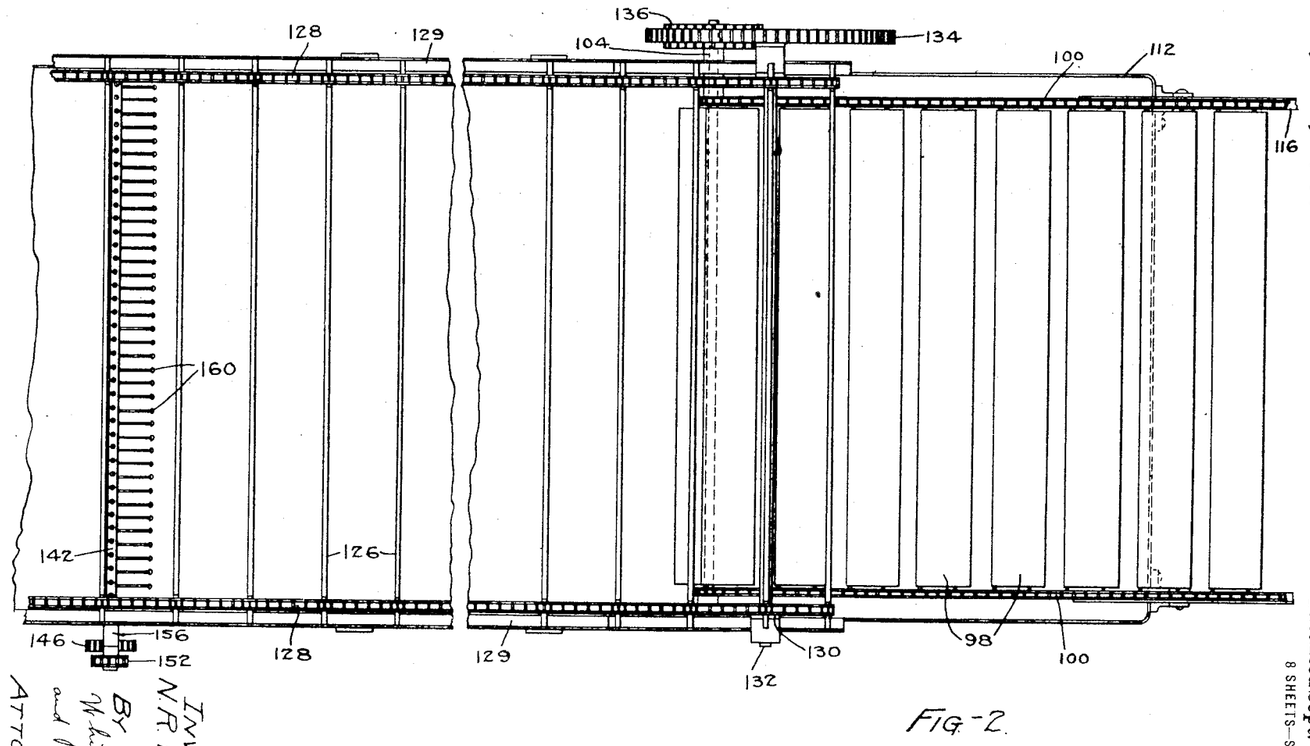
Fig. 2 is a top plan view of the middle portion of the machine.
Figure 3:
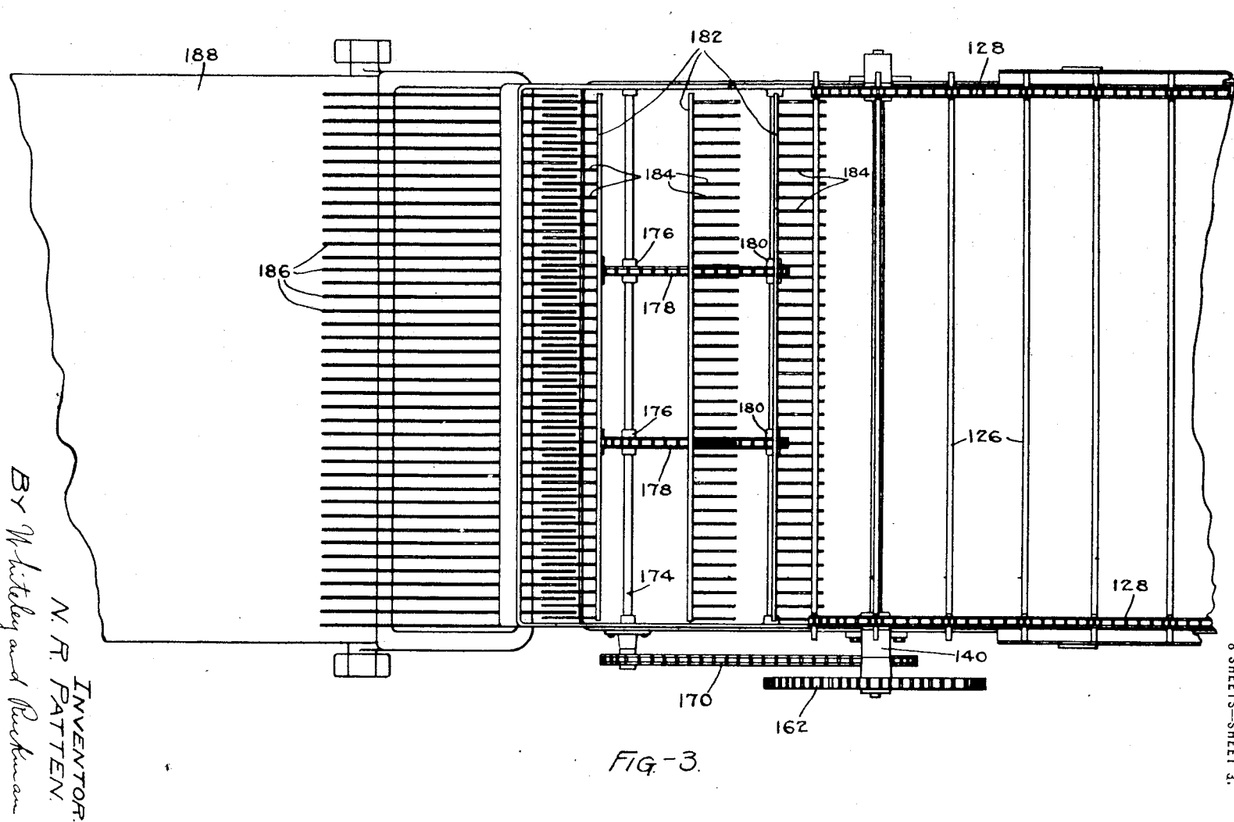
Fig. 3 is a top plan view of the rear portion of the machine.
Figure 4:
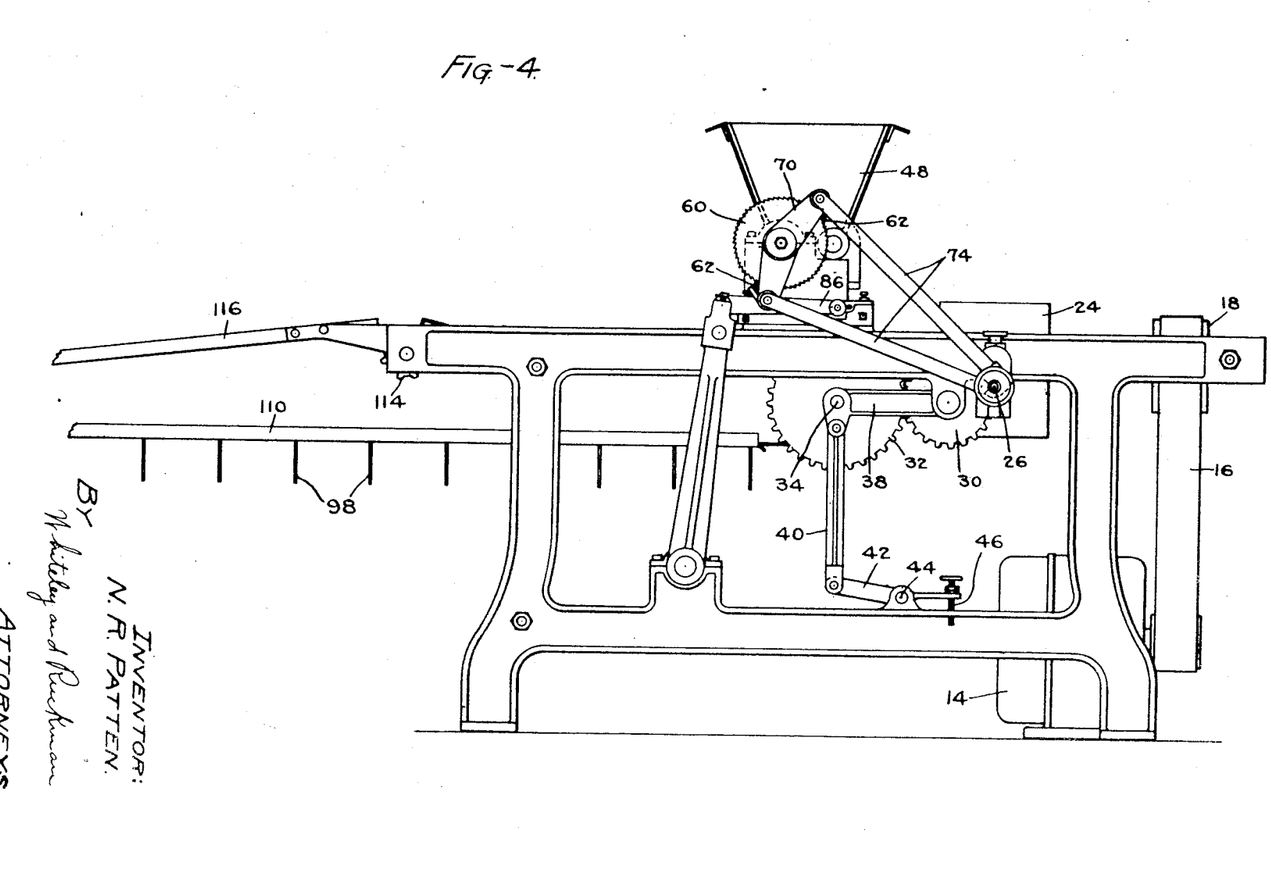
Fig. 4 is a view in side elevation of the portion of the machine shown in Fig. 1.
Figure 5:
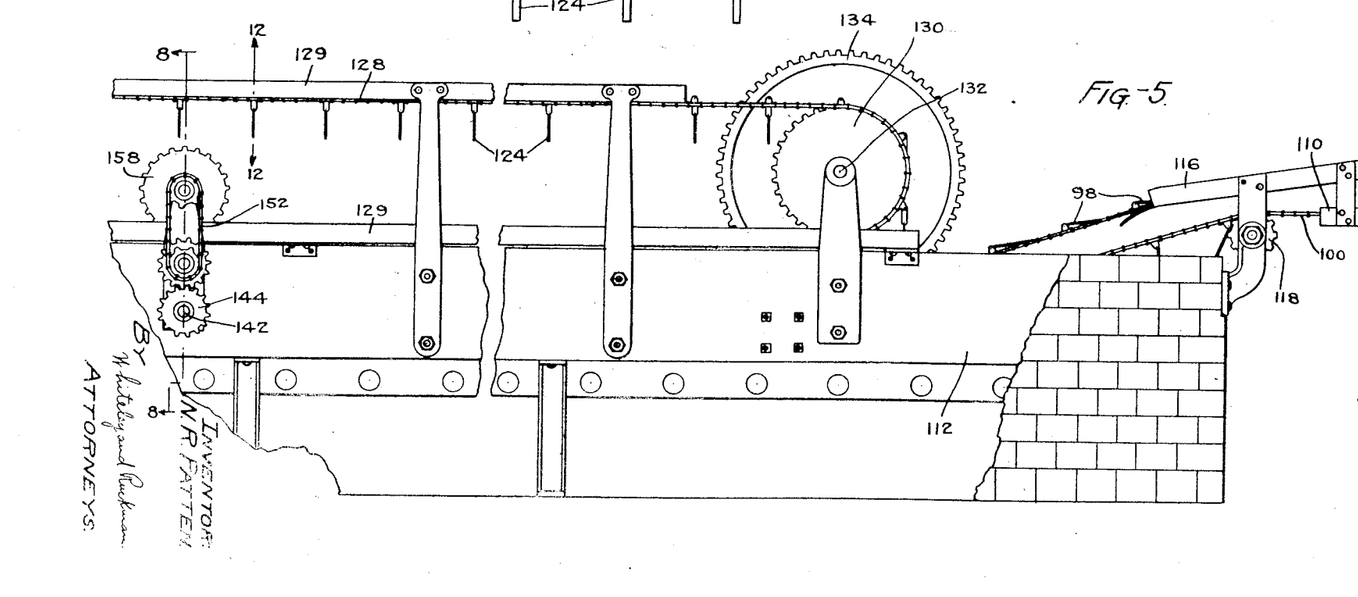
Fig. 5 is a view in side elevation of the portion of the machine shown in Fig. 2.
Figures 6, 13:
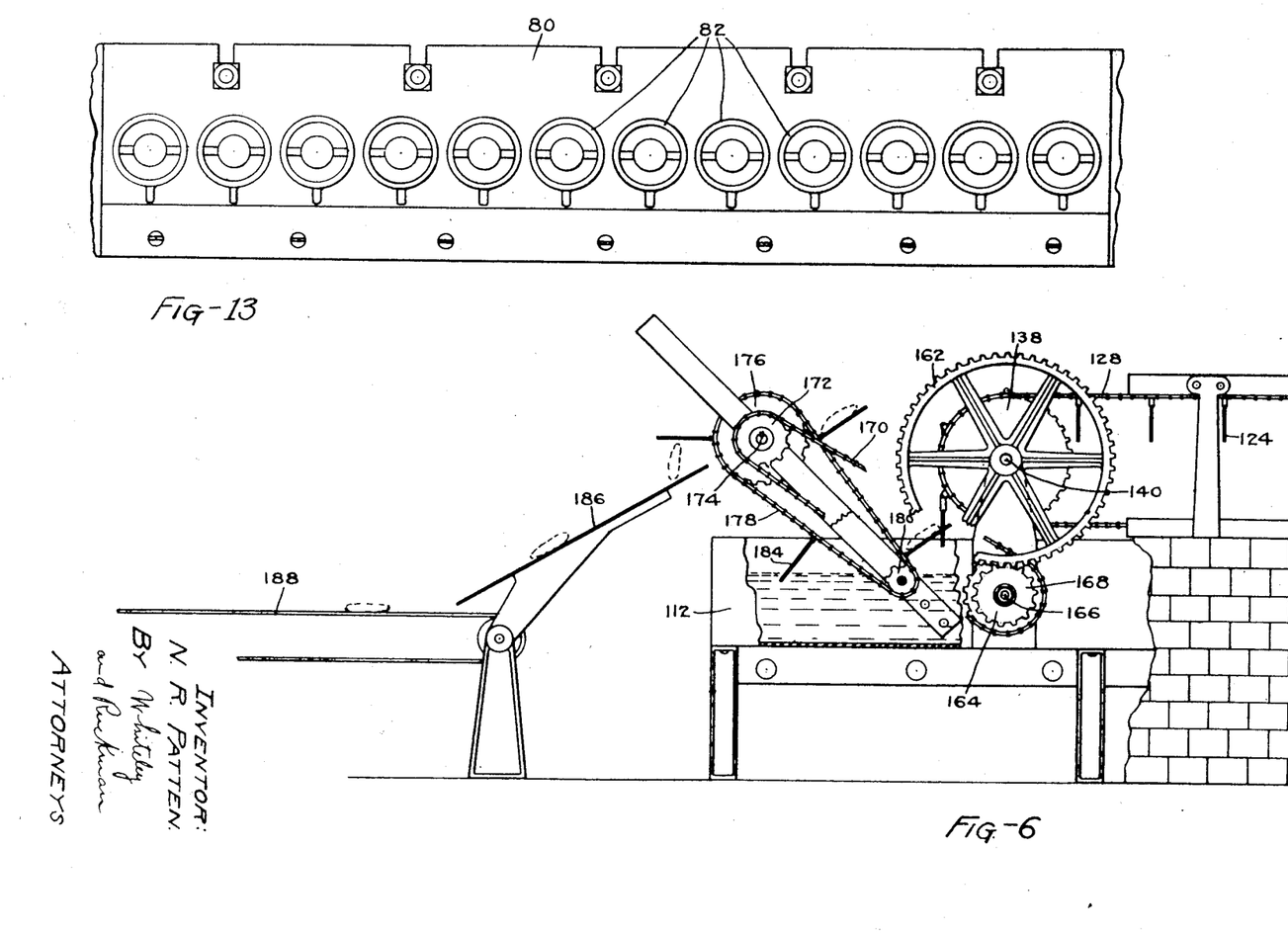
Fig. 6 is a view in side elevation of the portion of the machine shown in Fig. 3.
Fig. 13 is a view substantially on the line 13—13 of Fig. 7.
Figures 7, 10, 11:
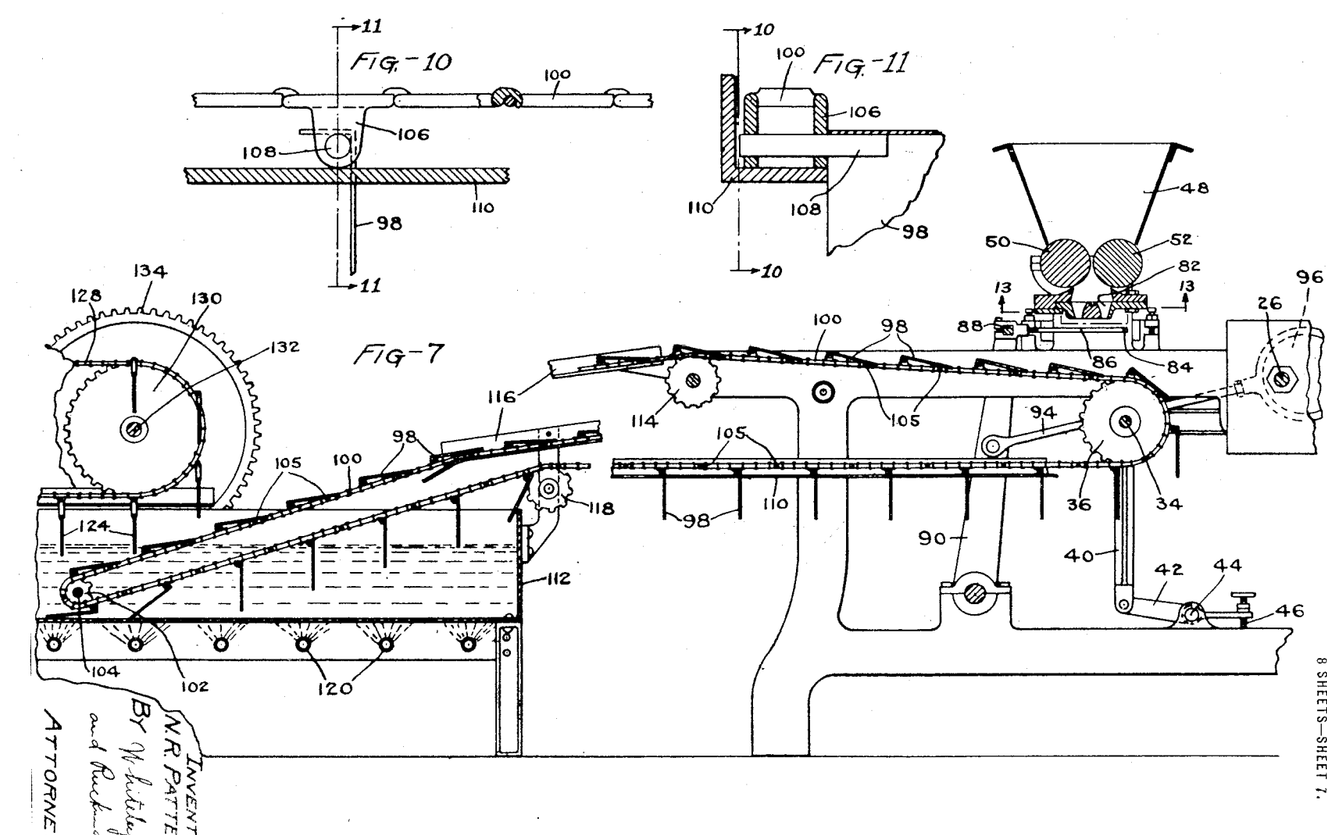
Fig. 7 is a view in central vertical longitudinal section of a portion of the machine with an intermediate portion broken away.
Fig. 10 is a detail view of a portion of a conveyer on the line 10—10 of Fig. 11.
Fig. 11 is a detailed view on the line 11—11 of Fig. 10.
Figure 8:
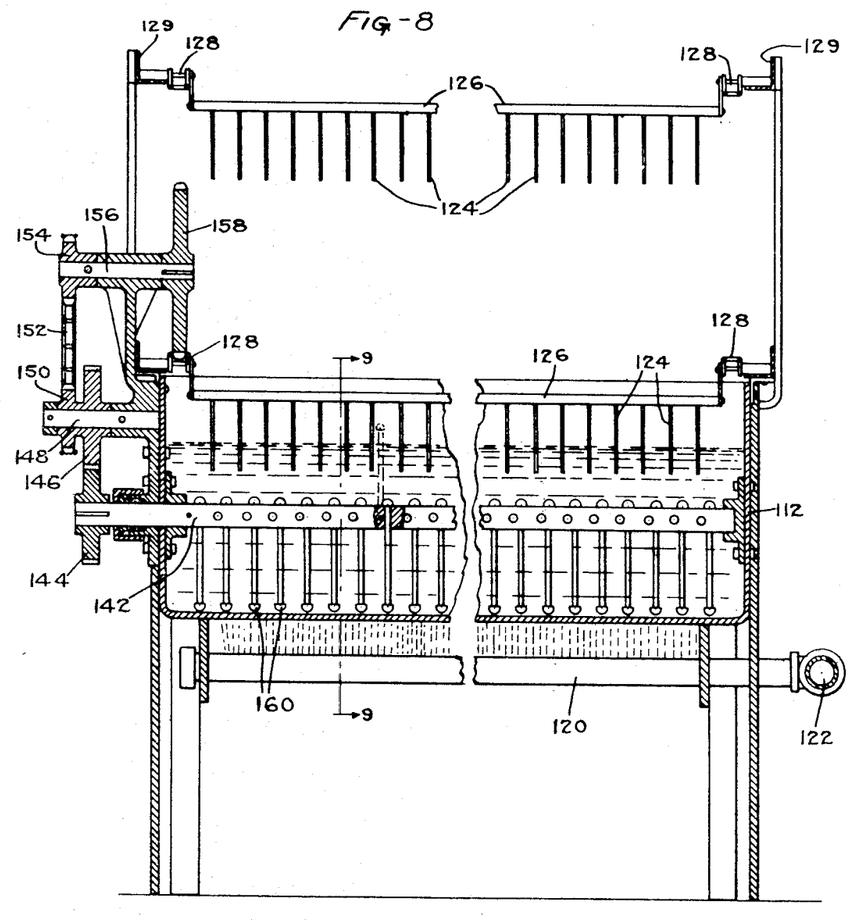
Fig. 8 is a view in vertical transverse section on line 8—8 of Fig. 5.
Figure 9:
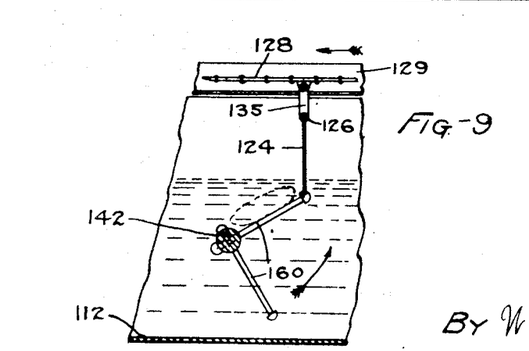
Fig. 9 is a fragmentary view substantially on the line 9—9 of Fig. 8.
Figure 12:
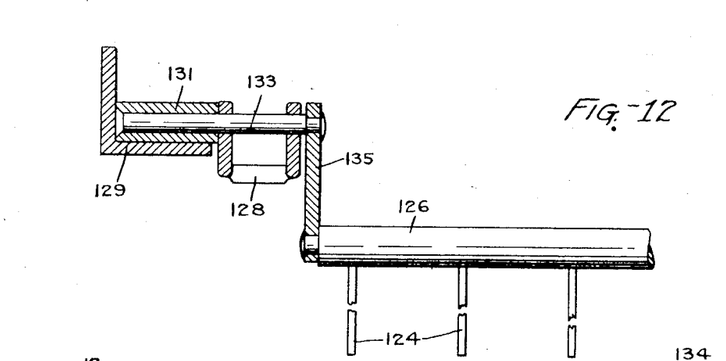
Fig. 12 is an enlarged detailed view of a portion of a carrier device.

Referring to the particular construction shown in the drawings, and considering first in detail the construction shown in Figs. 1, 4, and 7, the numeral 14 designates an electric motor which drives a belt 16 for rotating a pulley 18 secured to a shaft 20 supported in a bearing 22 mounted on the frame of the machine. The shaft 20 extends into a gear box 24 containing suitable gearing whereby the shaft 20 drives a transverse shaft 26. Secured to the shaft 26 is a gear 28 which meshes with an idler gear 30 which, in turn, meshes with a gear 32 secured to a shaft 34. Also secured to the shaft 34 are a pair of spaced sprocket wheels 36 for driving a conveyer which will be described in detail later. The shaft 34 is mounted at both of its ends in bars 38, the rear ends of which are movable up or down so as to adjust the height of the front end of the conveyer which runs over the sprocket wheels 36. In order to hold the shaft 34 in any desired adjusted position, the rear ends of the bars 38 are connected by links 40 to levers 42 pivoted at 44 to the frame, these levers being provided with adjusting screws 46 at their forward ends. A dough hopper 48 is secured to the frame and at the bottom of this hopper are a pair of feeding rollers 50 and 52 which are caused to rotate in unison by intermeshing gears 54 and 56. These rollers are given an intermittent rotary motion by the following mechanism: Secured to the ends of the shaft of the roller 50 are ratchet wheels 58 and 60. The teeth of these ratchet wheels are engaged by dogs 62 carried by lugs 64 and 66 on arms 68 and 70 which are oscillatingly mounted at the center of the ratchet wheels. The two ends of the arms 68 and 70 are connected by links 72 and 74 with eccentrics 76 and 78 on the shaft 26 whereby the dogs are given an oscillating movement. Mounted below the rollers 50 and 52 is a die-plate 80 provided with a plurality of doughnut dies 82, there being twelve of these, as shown in Fig. 13. In order to cut off the dough which is forced through these dies to form the raw doughnuts, a wire cutter 84 is provided, this cutter being stretched between the pair of arms 86 which are carried by a transverse bar 88 secured to the upper ends of levers 90 and 92 pivoted to the framework. The lever 90 is connected by a pitman 94 with an eccentric 96 secured to the shaft 26 and by means of which the wire cutter is oscillated to cut off the dough after it has been forced through the dies 82. The raw doughnuts drop on carrier plates 98 which are pivotally attached to endless sprocket chains 100 which run over the sprocket wheels 36, previously referred to, and over sprocket wheels 102 secured to a shaft 104. The carrier plates 98 when on the upper stretch of the sprocket chains engage rods or pins 105 so as to be maintained in substantially a horizontal or only slightly inclined position as shown in Fig. 7 and, when on the lower stretch of the sprocket chains, the carrier plates hang vertically as shown in Figs. 7, 10, and 11. The carrier plates, as best shown in Figs. 10 and 11, are pivoted to lugs 106 carried by some of the links of the chains by means of pivot members 108 and these lugs during a portion of the lower stretch of the chains rest upon angle bars 110. The shaft 104 is mounted in bearings near the bottom and toward the forward end of a grease or oil tank 112 and the sprocket wheels 102 secured to the shaft are of comparatively small size. The chains 100 are supported on their upper stretch by intermediate sprocket wheels 114 and by inclined bars 116, so that the rearward portions of the chains are caused to incline downwardly and travel beneath the grease in the tank. The chains on their lower stretch run over intermediate sprocket wheels 118. The oil or grease in the tank is heated by a plurality of burners 120 placed underneath the tank and connected to a gas supply pipe 122. When the carrier plates 98 dip beneath the hot grease, the raw doughnuts carried thereby rise to the top and are engaged by fingers 124 attached to transverse bars 126 carried by endless sprocket chains 128. These chains when on their lower stretch are supported as best shown in Fig. 12 by angle bars 129 upon which travel engaging members 131 carried by pivot members 133 attached to the chains and upon which are mounted arms 135 which carry the transverse bars 126. The chains 128 at their forward ends run around sprocket wheels 130 secured to a transverse shaft 132. A gear 134 is secured to the shaft 132 and meshes with a pinion 136 secured to the shaft 104 which thus drives the chains 128. At their rear ends, the chains run around sprocket wheels 138 secured to a shaft 140. As best shown in Figs. 2, 8, and 9, a shaft 142 is mounted intermediate the length of the tank 112 and below the level of the grease therein. This shaft projects through a stuffing-box at one side of the tank and upon the projecting end is secured a gear 144 which meshes with a gear 146 secured to a shaft 148 to which is also secured a sprocket wheel 150 around which runs an endless sprocket chain 152. This chain also runs around a sprocket wheel 154 secured to a shaft 156 to which is secured a sprocket wheel 158 engaged by the lower stretch of one of the chains 128, the arrangement being such that the shaft 142 is rotated in the direction of the arrow shown in Fig. 9. Extending through the shaft 142 are a plurality of slidable headed rods 160 arranged in two sets extending at right angles to each other. As will be seen from Fig. 9, these slidable rods engage the partly cooked doughnuts which are carried along by the fingers 124 and turn them over in the hot grease. When the rods are in a vertical position, they slide downward through the shaft and thus do not interfere with the proper engagement of the fingers 124 with the doughnuts which have been turned. It is obvious that the two ends of the slidable rods operate at angular distances of 180° from each other. Secured to the shaft 140, previously referred to, and near the rear end of the tank, is a gear 162 which meshes with a gear 164 secured to a shaft 166. Secured to this shaft is a sprocket wheel 168 around which runs a sprocket chain 170 which runs around a sprocket wheel 172 secured to a shaft 174. Secured to the shaft 174 are a pair of sprocket wheels 176 around which run sprocket chains 178 also running around sprocket wheels 180 which are at or slightly below the level of the grease in the tank. Secured to the sprocket chains 178 are transverse bars 182 which carry fingers 184 arranged to pass between the fingers 124 and carry the completely cooked doughnuts out of the grease as shown in Fig. 6 and deposit them upon an inclined grid 186 down which they slide upon an endless conveyer 188 for carrying them to any desired place.

The operation and advantages of my invention will be obvious from the foregoing description. Dough is supplied to the hopper in any suitable manner, and is fed intermittently through the forming-dies and cut off, the raw doughnuts dropping upon the carrier plates 98. The distance through which the doughnuts drop before they reach the carrier plates is controlled by means of the adjusting screws 46 which enable the operator to raise or lower the front end of the conveyer to which the carrier plates are attached. The doughnuts travel some distance and are given time to become conditioned before reaching the hot grease and when they are carried underneath the surface of the cooking medium, they quickly rise to the surface and are engaged by the fingers 124 and moved toward the rear end of the tank. When they reach the position of the slidable rods 160, they are turned over, as shown in Fig. 9, and are again engaged by the fingers 124 and carried to the rear of the tank. At the last place, the completely cooked doughnuts are lifted by the fingers 184 and deposited upon the grid 186 down which they slide upon a conveyer 188 which carries them to the desired position.

I claim:

1. A doughnut machine comprising means for forming raw doughnuts, an endless conveyer adapted to run underneath said forming means and receive the doughnuts, a tank for containing a cooking medium, means for heating said tank, means for causing the delivery end of said conveyer to run beneath the surface of the cooking medium in said tank, means for moving the doughnuts from the forward end of said tank to the rear thereof, and means interposed between the ends of said tank for turning over the doughnuts.

2. A doughnut machine comprising means for forming raw doughnuts, an endless conveyer adapted to run underneath said forming means and receive the doughnuts, a tank for containing a cooking medium, means for heating said tank, means for causing the delivery end of said conveyer to run beneath the surface of the cooking medium in said tank, an endless traveling device mounted to run above said tank, fingers attached to said traveling device for moving the doughnuts from the forward end of said tank to the rear end thereof, means intermediate the ends of said tank for turning over the doughnuts, and means for lifting the cooked doughnuts from said tank.

3. A doughnut machine comprising means for forming raw doughnuts, endless conveyer chains adapted to run underneath said forming means, carrier plates attached to said chains for receiving the doughnuts, a tank for containing a cooking medium, means for heating said tank, means for causing the delivery end of said conveyer chains to run beneath the surface of the cooking medium in said tank, endless chains mounted to run above said tank, fingers attached to said endless chains for moving the doughnuts from the forward end of said tank to the rear end thereof, means intermediate the ends of said tank for turning over the doughnuts, inclined endless chains at the rear of said tank, and fingers secured to said chains for lifting the cooked doughnuts from said tank.

4. A doughnut machine comprising means for forming raw doughnuts, endless conveyer chains adapted to run underneath said forming means, carrier plates attached to said chains for receiving the doughnuts, a tank for containing a cooking medium, means for heating said tank, means for causing the delivery end of said conveyer chains to run beneath the surface of the cooking medium in said tank, endless chains mounted to run above said tank, fingers attached to said endless chains for moving the doughnuts from the forward end of said tank to the rear end thereof, means intermediate the ends of said tank for turning over the doughnuts, inclined endless chains at the rear of said tank, fingers secured to said chains for lifting the cooked doughnuts from said tank, an inclined grid upon which the doughnuts are deposited, and a conveyer upon which the doughnuts pass from said grid.

5. A doughnut machine comprising a tank for containing a cooking medium, means for heating said tank, means for moving doughnuts from one end of said tank to the other end thereof, a shaft intermediate the ends of said tank, means for rotating said shaft, and a plurality of headed rods slidably mounted on said shaft, said rods during their rotary movement being adapted to slide into position to turn over the doughnuts.

In testimony whereof I hereunto affix my signature.

NATHANIEL R. PATTEN.